(12) United States Patent
Miyamoto et al.

(10) Patent No.: US 7,058,797 B2
(45) Date of Patent: Jun. 6, 2006

(54) USE OF OFF-MOTHERBOARD RESOURCES IN A COMPUTER SYSTEM

(75) Inventors: Carleton Miyamoto, San Jose, CA (US); Jagadish Bandhole, Cupertino, CA (US); Sekaran Nanja, San Jose, CA (US)

(73) Assignee: Veritas Operating Corporation, Mountain View, CA (US)

( * ) Notice: Subject to any disclaimer, the term of this patent is extended or adjusted under 35 U.S.C. 154(b) by 508 days.

(21) Appl. No.: 10/241,749

(22) Filed: Sep. 10, 2002

(65) Prior Publication Data

US 2004/0049670 A1    Mar. 11, 2004

(51) Int. Cl.
*G06F 13/14* (2006.01)

(52) U.S. Cl. .............................. 713/1; 713/2; 713/100; 717/168; 717/178; 705/26; 705/27

(58) Field of Classification Search .................... 713/1, 713/2, 100; 717/168–178; 705/26, 27
See application file for complete search history.

(56) References Cited

U.S. PATENT DOCUMENTS

| | | | | |
|---|---|---|---|---|
| 5,942,738 | A * | 8/1999 | Cesaire et al. | 235/380 |
| 5,974,547 | A | 10/1999 | Klimenko | 713/2 |
| 6,092,189 | A | 7/2000 | Fisher et al. | 713/1 |
| 6,262,726 | B1 | 7/2001 | Stedman et al. | 345/333 |
| 6,298,443 | B1 | 10/2001 | Colligan et al. | 713/200 |
| 6,308,238 | B1 * | 10/2001 | Smith et al. | 710/310 |
| 6,477,624 | B1 | 11/2002 | Kedem et al. | 711/147 |
| 6,498,791 | B1 | 12/2002 | Pickett et al. | 370/353 |
| 6,512,526 | B1 | 1/2003 | McGlothlin et al. | 345/762 |
| 6,577,229 | B1 * | 6/2003 | Bonneau et al. | 340/10.41 |
| 6,598,131 | B1 | 7/2003 | Kedem et al. | 711/147 |
| 6,615,365 | B1 | 9/2003 | Jenevein et al. | 714/6 |
| 6,722,985 | B1 * | 4/2004 | Criss-Puszkiewicz et al. | 463/29 |
| 6,735,627 | B1 * | 5/2004 | Urien | 709/223 |
| 6,801,927 | B1 * | 10/2004 | Smith et al. | 709/202 |

OTHER PUBLICATIONS

Huang, Peter, California Polytechnic State University *Design and Implementation of the CiNIC Software Architecture on a Windows Host*, Feb. 2001, pp. i-87, http://www.ee.calpoly.edu/3comproject/masters-thesis/Huang-Peter.pdf.

(Continued)

*Primary Examiner*—A. Elamin
(74) *Attorney, Agent, or Firm*—Campbell Stephenson Ascolese LLP

(57) ABSTRACT

A system uses a protocol stack on a card external to a motherboard in a target computer system. A processor on the motherboard is able to make use of the external protocol stack during boot-up of the computer, or at any other time, so that it is not necessary to load the protocol stack into the motherboard's memory. This saves time, memory, and disk space and permits an external, managing, computer system to communicate with a computer just after power-up without loading and configuring a protocol stack so that the managing computer system can control the boot-up of the target computer system. The extra memory saved, especially, is important in running many MS-DOS applications, such as firmware flash utilities. A preferred embodiment of the invention uses a UDP/Internet Protocol (UDP/IP) stack resident in a Preboot Execution Environment (PXE) on, e.g, a network card. The approach described herein can be applied to other utilities, protocol stacks or resources (hardware and software) on other cards.

10 Claims, 6 Drawing Sheets

OTHER PUBLICATIONS

Henry, Mike, Intel Corporation, *Extending PXE to Mobile Platforms*, Jun. 1998, pp. 1-4, http://www.intel.com/update/archive/psn/psn06985.pdf.

Copy of International Search Report as mailed from the PCT on Aug. 13, 2004, for counterpart WO Application (PCT/US03/28820;Filed Sep. 10, 2003), 3 pages).

* cited by examiner

USE OF OFF-MOTHERBOARD RESOURCES IN A COMPUTER SYSTEM

This application is related to the following U.S. Patent Applications which are hereby incorporated by reference as if set forth in full in this document:

Ser. No. 09/663,252 entitled "USER INTERFACE FOR DYNAMIC COMPUTING ENVIRONMENT USING ALLOCABLE RESOURCES" filed on Sep. 15, 2000, still pending;

Ser. No. 10/241,808 entitled "SYSTEM FOR MANAGING BOOT-UP OF TARGET COMPUTERS" filed on Sep. 10, 2002, still pending; and Ser. No. 10/241,809 entitled "SYSTEM FOR AUTOMATED BOOT FROM DISK IMAGE" filed on Sep. 10, 2002, still pending.

BACKGROUND OF THE INVENTION

This invention relates in general to digital data processing and more specifically to a system for using utilities, protocols and other resources that are not directly provided to a processor in a computer system.

A typical computer system uses a "motherboard" that includes a processor, memory, and supporting hardware resources such as bus management, co-processing, etc. A basic input/output operating system, configuration routines or utilities and other low-level code is usually provided on a read-only memory (ROM), flash-programmable memory or other non-transient memory. The processor on the motherboard can make use of other off-motherboard resources and devices by using communication links supported via buses, ports, etc. For example, a processor can use an external hard disk drive via an Integrated Development Environment (IDE), Small Computer System Interface (SCSI), Universal Synchronous Bus (USB), IEEE 1394 (Firewire), or other bus.

When a computer system is first powered-up, many functions must take place to put the computer into an operational stage. These functions are commonly referred to as "boot-up," "booting," "bootstrapping," "booting up," etc. During boot-up, the amount of resources, such as memory, resident code or instructions, etc., that a processor has available to it are minimal. Many of the external devices may not be useable because the proper drivers, utilities, applications or other necessary programs have not been loaded, yet.

On the other hand, some boot-up situations, especially where an external computer system is managing the boot-up of a target computer system, require the processor to perform important functions such as communicating with external devices over a network as soon as possible. These functions may not be available to the processor unless, for example, the appropriate "protocol stack" for communication has been loaded from a floppy disk. Naturally, the loading of a specific protocol stack, itself, can require communicating with an external storage or transfer device or link, and the protocol stack will need to occupy storage space.

Thus, it is desirable to improve the ability of a processor to use resources, especially during boot-up or shortly after power-on.

BRIEF SUMMARY OF THE INVENTION

The present invention uses a protocol stack on a card external to a motherboard in a target computer system. A processor on the motherboard is able to make use of the external protocol stack during boot-up of the computer, or at any other time, so that it is not necessary to load the protocol stack into the motherboard's memory. This saves time and memory space and permits an external, managing, computer system to communicate with a computer just after power-up without loading and configuring a protocol stack so that the managing computer system can control the boot-up of the target computer system.

A preferred embodiment of the invention uses User Datagram Protocol/Internet Protocol (UDP/IP). See, e.g., RFC 768. The UDP/IP stack is resident in a Preboot Execution Environment (PXE) on a network interface card (NIC). Other types of cards may be used. NIC cards may be expansion cards (such as a PCI card) or may be built into the motherboard of a computer. Examples of companies that provide NIC cards with PXE support are Intel and 3COM. The approach described herein can be applied to other utilities, protocol stacks or resources (hardware and software) on other cards.

In one embodiment the invention provides a method for allowing a processor on a motherboard to communicate with a network without loading a network communication protocol, the method comprising directing the processor to use an off-motherboard communication protocol. This method uses less memory than if a software protocol stack were used. This extra memory is often critical in running MS-DOS applications (such as firmware update programs that update flash memory) because of MS-DOS's limit of 640K.

DETAILED DESCRIPTION OF THE INVENTION

A preferred embodiment of the invention is embodied in systems manufactured by Jareva Technologies, Inc. Aspects of these systems are discussed in the co-pending patent applications referenced above. Some of the aspects of these co-pending applications are next discussed, followed by a description of further details of the invention under the heading "Processor Redirection to Remote Resources," below.

Figure 1:
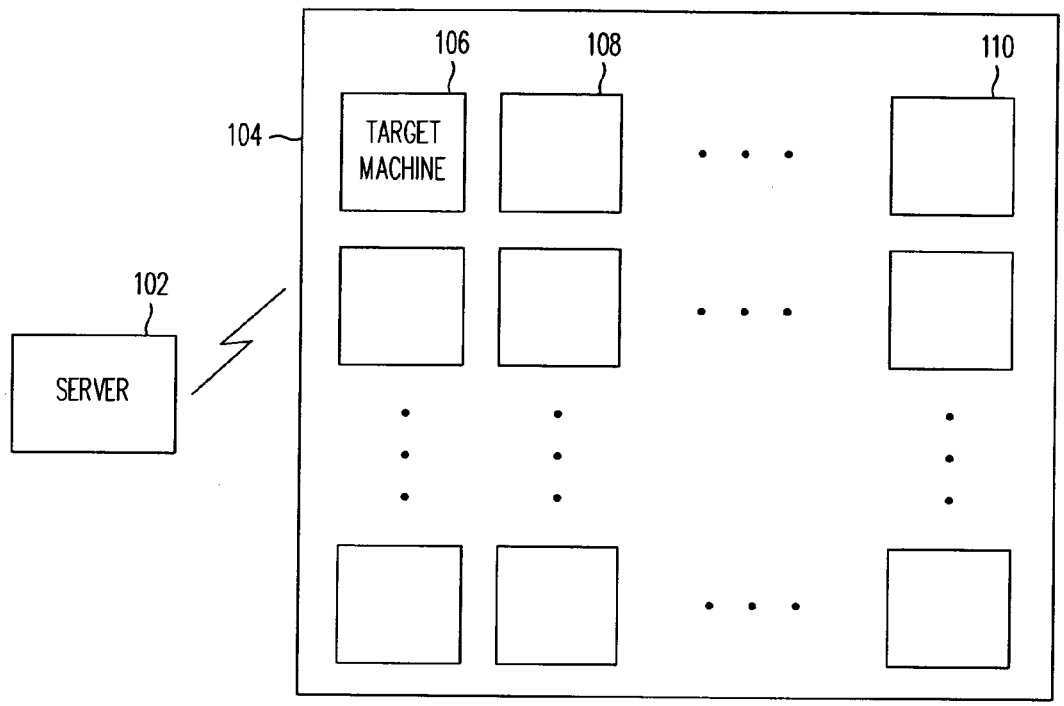
FIG. 1 shows an application of the system of the present invention.

FIG. 1 shows an application of the system of the present invention.

In FIG. 1, server 102 is a computer system for managing target machines in a configurable network. The configurable network is represented by resource 104. Any type of processing equipment or devices can be considered resources including processing units, memory, communication bandwidth, storage, functionality, etc. Such resources can be provided by software, hardware or a combination of both.

Server 102 detects when target machines such as 106, 108 and 110 are initially powered up. A preferred embodiment of the invention requires a human administrator to manually power up one or more target machines. Other embodiments can automate the power-up process. Server 102 then acts to control the boot up of one or more of the target machines, as desired. During boot-up, characteristics and resources that are local to a specific target machine (e.g., disk drive, random-access memory (RAM), processor type, peripherals, communication ability such as network cards, etc.) are determined or "discovered" and reported back to the server. After controlled boot-up and discovery, server 102 can also activate, allocate, or configure, resources, including resources 104, to work with a target machine. Server 102 can manage operations including loading software on the target machines, directing interconnectivity of target machines on a network, etc.

A preferred embodiment of the invention is adapted for use with dynamic computing environments (DCEs) such as the DCE described in co-pending U.S. patent application Ser. No. 09/663,252 entitled "USER INTERFACE FOR DYNAMIC COMPUTING ENVIRONMENT USING ALLOCABLE RESOURCES" filed on Sep. 15, 2000.

Target machines can be any type of computer system or other processing device. For example, personal computer systems, servers, workstations, mainframes, etc., can be target machines. Such machines can be based around different manufacturers' designs such as Intel, Advanced Micro Devices (AMD), SUN Microsystems, etc. Different models, versions and configurations of machines are typically available from each manufacturer. For example, some machines may vary in the processor type, attached peripherals, internal memory capacity, communication ability, etc. Target machines can also be devices that are not based on a general purpose microprocessor design. For example, target devices can be based on parallel processing, distributed processing, asynchronous or other designs. Target machines can be standalone peripherals, network devices, etc. Target machines can use customized circuitry, application-specific integrated circuits (ASICs), field-programmable gate arrays (FPGAs), discrete, dedicated or custom circuitry, etc. In general, any type of device, including digital, analog, mechanical, biotechnology, optical, etc. can be a target machine.

In the preferred embodiment, the target machines are configured and interconnected. The interconnection mechanism can be by hardwire, fiber optic, wireless or other type of communication link. A digital network such as, e.g., Ethernet, IEEE 1394, universal serial bus (USB), 802.11b, etc. can be used. In a preferred embodiment, the linking of communication channels between target machines, the server, external devices and networks (such as the Internet), etc., is controlled and managed by the server.

Note that server 102 can, similarly, be any type of a processing device from any manufacturer. Many types of processing devices can be used to implement server 102. Additionally, different types of software from those specifically discussed herein can be run on server 102 to achieve the same functionality described in the present invention. Multiple computers or devices can be used to achieve the functionality of the managing server, discussed herein. In the preferred embodiment, the managing server executes software manufactured by Jareva Technologies, Inc., and referred to as "OpForce." Other software that performs functionality described herein manufactured by Jareva Technologies, Inc., includes "ActiveOS" and "OpBoot."

A preferred embodiment of the invention executes on Intel x86 chips and is written in a standard Linux INITRD format. OpBoot is treated as a Network Boot Program (NBP) within the Linux environment as defined by the PXE standard. Steps accomplished by this preferred embodiment are listed in Table I, below.

TABLE I

1. Initialize and read parameters form DHCP option-135 (see, e.g., DHCP standard RFC-2131 for description of DHCP options);
2. TFTP the two ActiveOS files into extended memory into the standard locations defined by Linux; and
3. Jump to the start of the Linux kernel (as defined by Linux).

Another embodiment executes on a Solaris platform. The Solaris version of the ActiveOS is a miniaturized version of the Sun Solaris OS. A bootstrap program is TFTPed and the rest of the ActiveOS is NFS mounted using the standard Solaris mechanisms. It should be apparent that any type of software that achieves the functions, operations and other aspects of the invention can be suitable for use in accordance with the invention and is within the scope of the invention, as claimed.

A preferred embodiment of the invention uses popular standardized protocols to allow the managing server to prepare target machines for communication and operation upon boot-up. The Dynamic Host Configuration Protocol (DHCP) is used to automate the assignment of Internet Protocol (IP) addresses in the resource network. A Bootstrap Protocol (BOOTP) along with DHCP options and BOOTP vendor information extensions is also used. This allows target machines without disks and specific bootstrapping software to discover the target machine's own IP address, the address of a server host and the name of a file to be loaded into memory and executed. Descriptions of these protocols can be found on the Internet, or by reference to the following Request For Comments (RFCs): RFC9510, RFC2131 and RFC2132. Other protocols for communicating within the DHCP framework include: Boot Control Transfer Protocol (BCTP), Trivial File Transfer Protocol (TFTP), user datagram protocol (UDP) and others. It should be apparent that the specific use of these protocols is not necessarily to practice the invention. In general, any type of protocol, communication scheme, network architecture, etc. can be acceptable for use with the present invention.

A preferred embodiment of the invention uses a mechanism whereby, upon power-up, a target machine communicates to the server that the target machine is ready to boot. In the preferred embodiment, each target machine is provided with a Network Interface Card (NIC) such as one that follows the Pre-boot Execution Environment (PXE) standard. The PXE NIC broadcasts a "ready-to boot" message to the server upon power-up. The server then transfers an executable object to the target machine. In a contemplated embodiment, the executable object is about 8 MB and is called ActiveOS™. ActiveOS is loaded and executed via instructions in OpBoot onto the target machine. ActiveOS then inspects the target machine to discover the hardware configuration, basic input/output system (BIOS) version and other aspects of the target machine. In the preferred embodiment, ActiveOS runs completely in memory so that no hard disk is needed since some target machines may not have a hard disk. ActiveOS is based on LINUX and launches a LINUX kernel to put up a TCP/IP stack.

Table II shows some of the information discovered and sent back to the server by ActiveOS.

TABLE II

Memory
Hard disks
Central Processing Unit (CPU)
Motherboard chip set

TABLE II-continued

System management (BIOS) information

Serial number
Model name
BIOS date/version
Computer manufacturer
BIOS vendor
Computer CPU family
Blade Chassis Location (if it is a blade)
Blade chassis serial number (if it is a blade)
Blade chassis IP address (if it is a blade)
Blade chassis model (if it is a blade)
Rack serial number
Network cards Table III shows an example of a format used to report information back to the server in a preferred embodiment. Note that other embodiments can use any suitable format. The protocol used in Table III is BCTP.

TABLE III

- - - StatusComplete 1
memsize=128;arch=i686;chipset=8086.7124;cpus=1;cpumhz=598;net={count=2;0={name=eth0;type=Ethernet;hwaddr=00:D0:B7:7E:94:BA};1={name=eth1;type=Ethernet;hwaddr=00:90:27:F9:5B:B5} };hd={count=1;0={name=/dev/hda;size=13} };smbios={BSmanufacturer={Intel\sCorp.};BSversion={CA81020A.86A.0005.P02.9911300426};BSreleaseDate={11/30/1999};MBcpuCount=1;MBavgCpuMhz=600;MBcpuFamily=17;MBmem=128}

In the preferred embodiment, the information in Table II, and additional information, as desired, is acquired from the target machine when ActiveOS receives a request from the server to generate hardware information. The results of discovering hardware information are sent back to server 102 in the form of scoped attribute value pairs in BCTP protocol. Again, other formats can be employed.

After discovery, the server provides a provisioning agent to the target machine. The provisioning agent is used to install desired software on the target machine. Since different hardware configurations require different types, or versions, of software, the provisioning agent is not loaded until after the hardware configuration of the target machine has been discovered. In a preferred embodiment, the provisioning agent is part of the ActiveOS.

A management system on the server receives a request either automatically, or from a user, that provides a definition of how to configure the target machines and other resources. The server communicates to the provisioning agent which software to install. The provisioning agent can obtain the software to be installed from the server or from a different source.

By default, the provisioning agent obtains the software from a storage server, such as an NFS server, a CIFS server, the OpForce server, etc. In general, the software can be obtained from any server connected to the network using a variety of protocols including custom software. OpForce supports a form of software called "ActiveOS software". The user can write a custom program that runs on the ActiveOS. This program is free to implement a protocol and gather information from any server reachable on the network. In fact, the user can use this to extend the hardware detection that we already do. The user first writes a standard Linux based application. This application is the uploaded into the OpForce system and placed on a storage server. When requested by the user, OpForce tells the ActiveOS to execute the software stored on the storage server. The BCTP messages looks similar to those shown in Table IV.

TABLE IV

SetAppDir nfs nfsserver:/directory
Modify myExecutable 1 argument1

When receiving this message, the ActiveOS accesses the NFS server, obtains the executable, and executes it.

Table V, below, shows basic steps in a procedure for controlled booting of a target machine where the target machine uses an Intel x86 architecture. Table V also shows, in curly brackets, the alternative protocol to be used when the machine is a SOLARIS type of machine as manufactured by SUN Microsystems, Inc., rather than an Intel machine. In a similar manner, other types of machines can be accommodated.

TABLE V

1. Use DHCP {Solaris = RARP} broadcast to find MAC
2. OpForce (or other server software) allocates IP and send DHCP {Solaris = RARP} response
3. Target downloads OpBoot through TFTP {Solaris = not used}
4. OpBoot downloads ActiveOS through TFTP {Solaris = NFS}

Different versions of ActiveOS are downloaded depending on the detected platform (e.g., SOLARIS OR INTEL). A preferred embodiment automatically determines the correct ActiveOS to use without any user input. DHCP option 60 (see the PXE standard), includes a string containing the architecture that is used to automatically select the correct ActiveOS. The target machine is then booted into the ActiveOS as previously described. ActiveOS is then used to discover the hardware in the machine. This is all done automatically without any user input and without any OS on the machine's hard disk. Other embodiments can use different degrees of manual and automatic operations.

Figure 2:
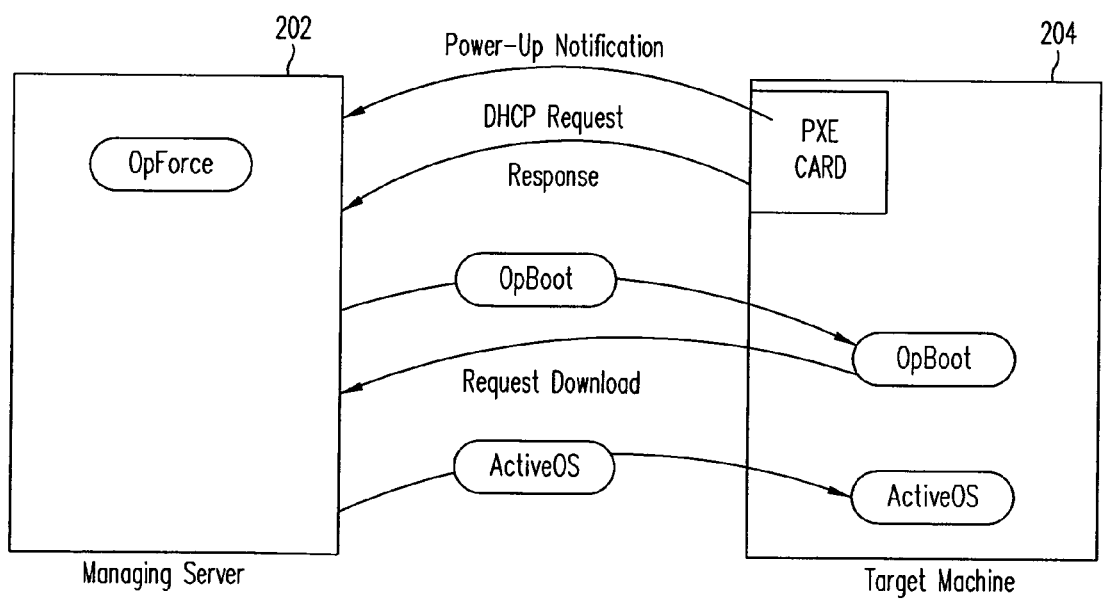
FIG. 2 illustrates steps in a managed boot-up procedure.

FIG. 2 illustrates the steps of Table V. In FIG. 2, managing server 202 controls the boot-up of target machine 204. For ease of illustration, only a single target machine, and single type (Intel architecture) of target machine, is discussed.

Upon power-up, target machine 204 sends a notification to managing server 202. In the preferred embodiment, the notification is made using a PXE card installed in the target machine. In other embodiments, different notification mechanisms can be used. PXE uses the DHCP protocol to generate a request, or notification. OpForce, executing in the managing server, receives the request, allocates an IP address and sends a response. Next, the target machine requests a download of software from the managing server. This results in the managing server transferring OpBoot. The target machine then executes OpBoot which requests a download of ActiveOS. ActiveOS is provided by the managing server and is installed and run on the target machine.

Automated Boot from Disk Image

After ActiveOS is loaded, one option provided by the system of the present invention is to allow the target machine to boot from a disk image. This option is very useful for systems, such as personal computers, that are designed to boot from a floppy disk. Preferably, the disk image is in random-access memory (RAM), but any type of storage, other than storage device that typically reads the disk image, is possible. The disk image can be distributed automatically from the managing server to one or more target machines. The procedure described herein is designed for PC platforms but other types of platforms can be handled in a similar manner.

Table VI shows steps in a procedure to boot a target machine from a disk image without requiring the placement, or existence, of a disk containing the image into a drive in the target machine.

TABLE VI

1. Load Managing Software onto target machine.
2. Setup DHCP to boot 1.44 MB image
3. Use BCTP to reboot target
4. Target sends DHCP request (step 1 of FIG. A)
5. OpForce server sends DHCP response
6. Target downloads OpBoot
7. OpBoot "boots" floppy image
8. Run user utility
9. Use OpBoot network stack to return result
10. OpForce server sets DHCP to load back to ActiveOS
11. Reboot target After step 1 of Table VI, it is assumed that Managing Software has been loaded into the target machine. Such software can be loaded, for example, as described above with respect to the ActiveOS software. In a preferred embodiment, the ActiveOS software, OpBoot and OpForce software performs the remaining steps of Table VI. Note that the operations, or steps, of Table VI can be performed by one or more types of different software and can be performed at one or more points in a system, such as the system of FIG. 1.

At step 2, DHCP is set to boot a standard 1.44 Mb image. The DHCP boot file is set to boot OpBoot (offset 0x6c in the DHCP packet). The DHCP specification defines a number of DHCP options. Options are identified by numeric numbers. DHCP option 135 passes an argument to OpBoot. This argument contains the name of the 1.44 MB image to download (via TFTP). An example of the argument format is: dhcp option-135 "dos=floppyimage.bin;additional arguments". The string "additional arguments" is returned on a call to vector 0xA1 (see step 8).

At step 3, BCTP is used to reboot the target machine.

Steps 4, 5 and 6, are similar to steps 1, 2 and 3, respectively of Table V. At step 4, the target machine uses DHCP to broadcast a request to the server to obtain an IP address. At step 5, the server sends a response. The target machine downloads boot software, such as OpBoot.

At step 7, the boot software obtains and boots to a floppy image. The floppy image can be the exact image that would reside on a floppy disk used to boot a PC from a disk drive. The floppy image is obtained from the server, or from some other source over, e.g., a network connection. It is not necessary for the target machine to obtain the floppy image from the floppy drive or from some other media-reading device connected to the target machine.

At step 8, the floppy image is executed to execute operations in accordance with the floppy image. These operations can be "user" directed such as installing and executing specific versions of operating systems, applications, drivers, utilities, etc. In general, any type of operation that can be performed by a floppy image in the traditional boot-up procedure (i.e., where the disk image is read from a floppy drive) can be performed using the system of the present invention.

The approach of the present invention may provide additional advantages not possible with the prior art approaches. For example, it may be possible to have a boot image that is greater than the 1.44 Mb capacity of the physical floppy medium. Also, the booting process is not slowed by reading of a floppy disk or other physical media. This may allow advantages such as monitoring or diagnostics during the boot-up phase.

The arguments passed from the DHCP option-135 can be retrieved using the BIOS vector 0xA1. The OpBoot API provides functions that the user can call to access PXE services from within a standard MS-DOS program. It is accessed via Int A1h and is only accessible when booting MS-DOS boot images. Table VII, below, shows some of these functions. Not all of the functions use PXE parameters.

TABLE VII

Services:

Get version

In: AX=0000h
Out: AL = version
AH = error code
CF set on error

Get boot parameters

In: AX=0001h
Out: ES:DI = points to null terminated character string
AH = error code
CF set on error Get boot server IP In: AX=0002h
Out: EBX = boot server IP address
AH = error code
CF set on error Get gateway IP In: AX=0003h
Out: EBX = gateway IP address
AH = error code
CF set on error Get subnet mask In: AX=0004h
Out: EBX = subnet mask
AH = error code
CF set on error Get IP address In: AX=0005h
Out: EBX = IP address
AH = error code
CF set on error Open network In: AX=0100h
Out: AH = error code
CF set on error Close network In: AX=0101h
Out: AH = error code
CF set on error

TABLE VII-continued

Services:

Read network

In: AX=0102h
CX = size of buffer
DX = destination port,
ES:SI = buffer to read into
Out: AH = error code
CF set on error
CX = number of bytes actually read Write network In: AX=0103h
EBX = IP address of destination
CX = number of bytes to write
EDX>>16 = destination port, DX = source port,
ES:SI = buffer to write
Out: AH = error code
CF set on error At step 9, the OpBoot network stack is used to return results to the server. This step is explained in more detail, below. This step is useful where, for example, the purpose of loading and executing the disk image is to run tests or gather other data from the system. In general, any type of information can be communicated.

At step 10, the target machine is set to load back to ActiveOS.

At step 11, the target machine is rebooted back to the Managing Software where the steps above can be repeated for another disk image, or for different purposes, as desired. Note that it is not necessary to perform all of the steps listed in Table VI to achieve advantages of the present invention. Also, additional steps may be included without detracting from the invention. The steps listed in Table VI are merely illustrative of a preferred embodiment.

Next, details of step 7 of Table VI are discussed in connection with FIG. 3. It should be apparent that these details can be performed in addition to other steps and need not have all operations executed in association with step 7 of Table VI.

Figure 3:
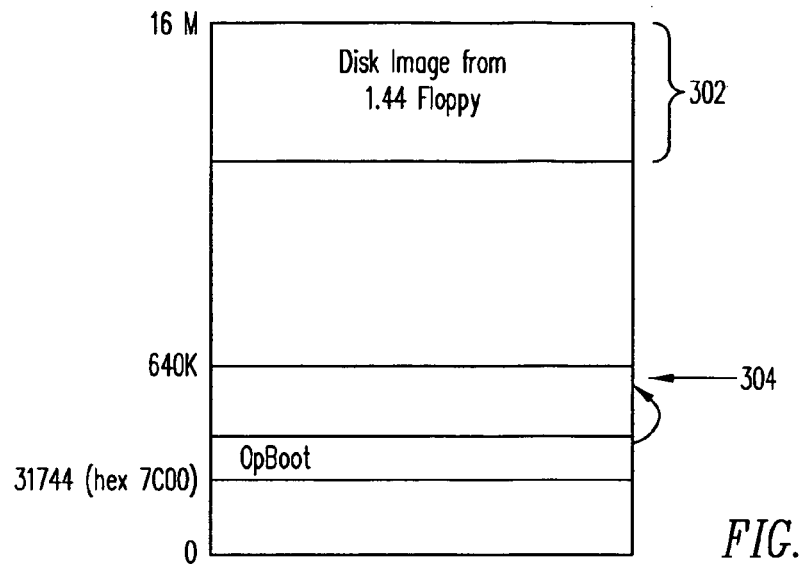
FIG. 3 is a simplified block diagram depicting a memory map of a personal computer showing details of booting using a disk image in accord with one embodiment of the present invention.
Figure 8:
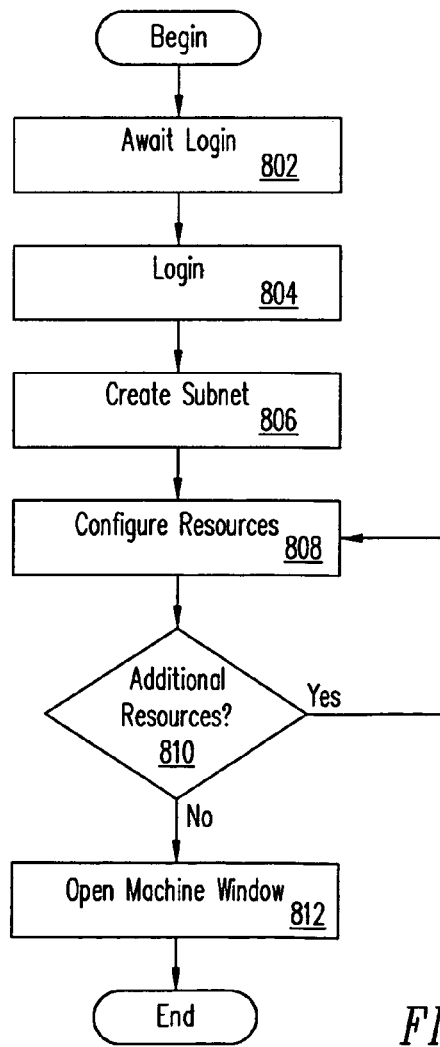
Figure 4:
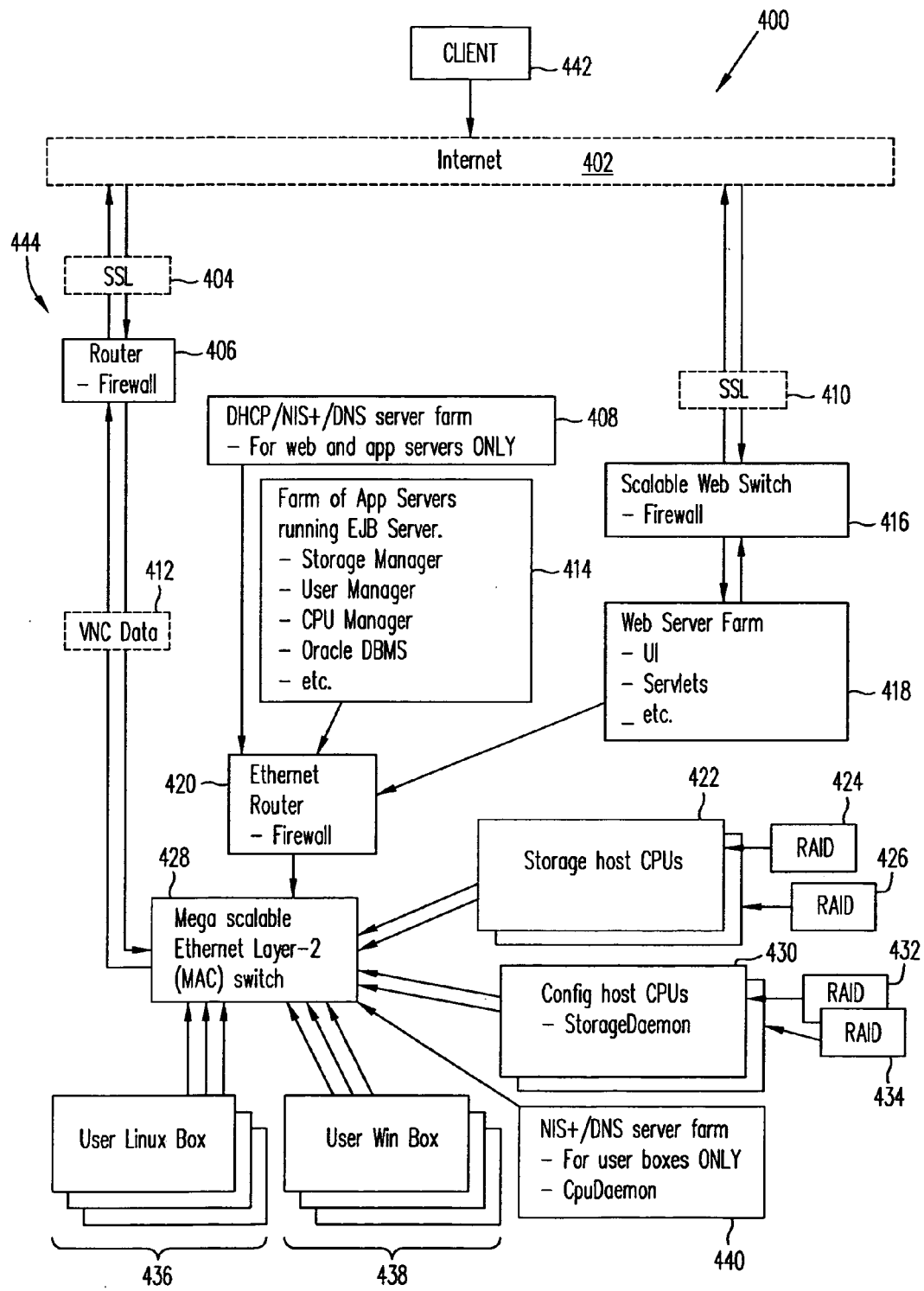
Figure 5:
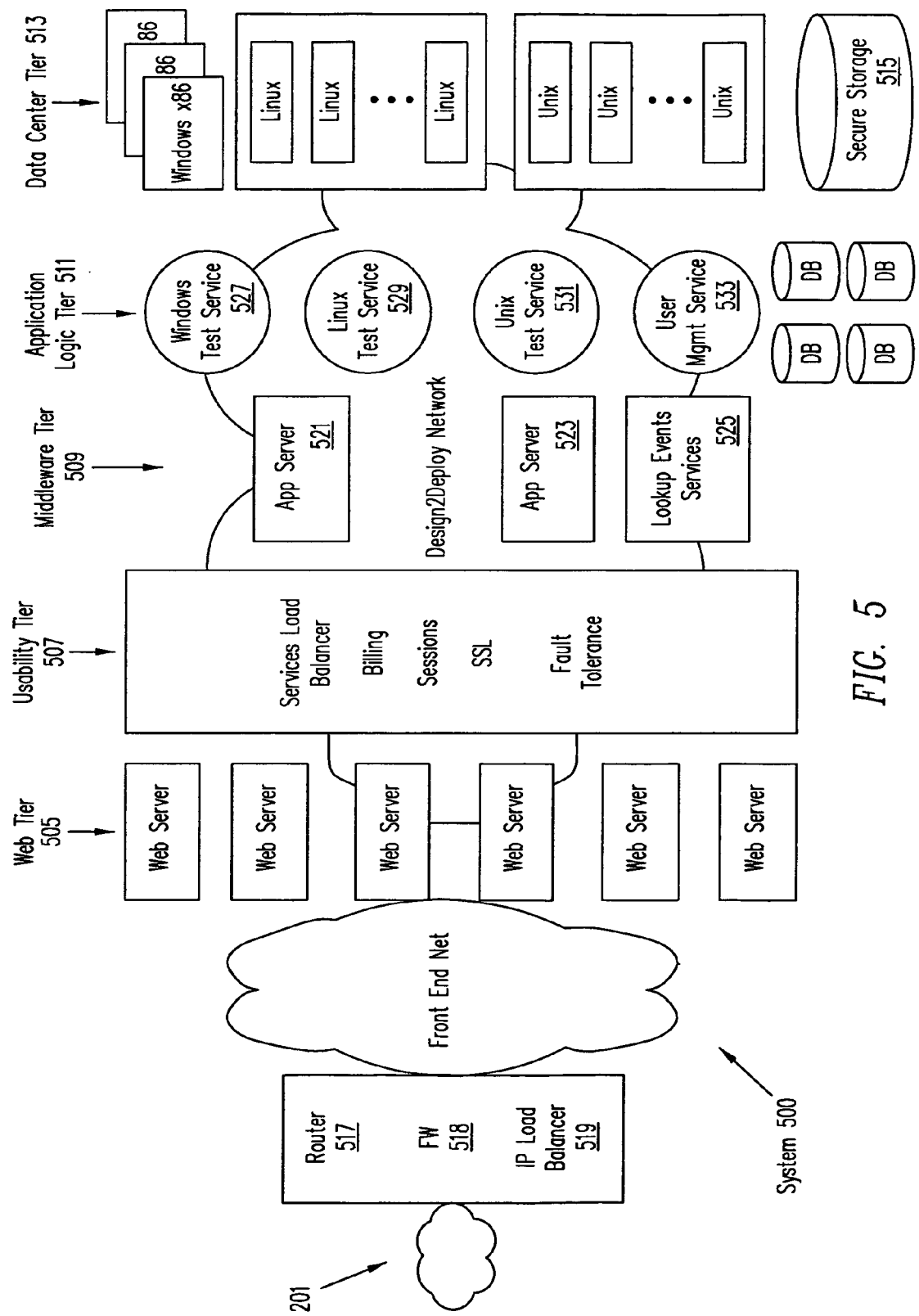
Figure 6:
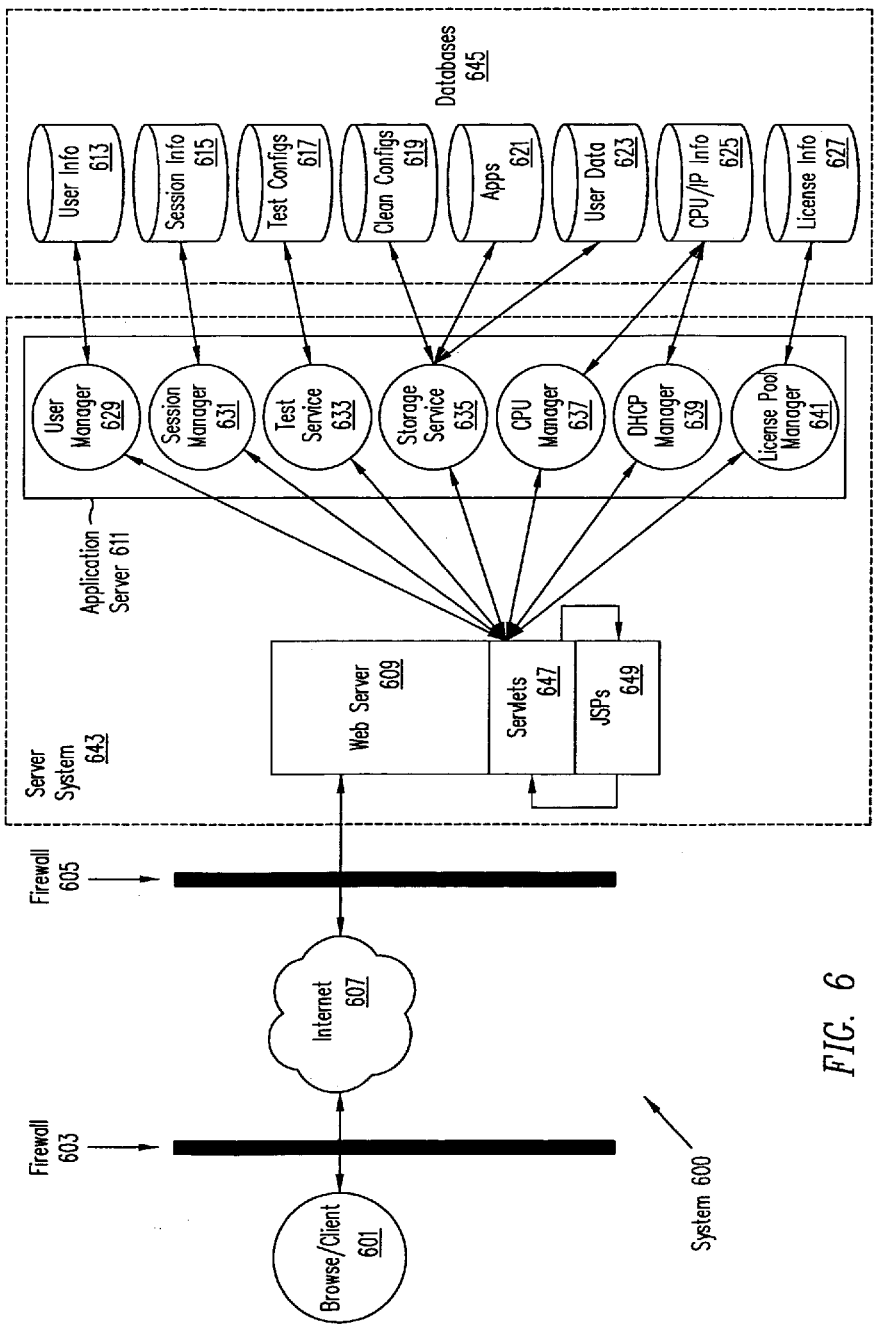
Figure 7:
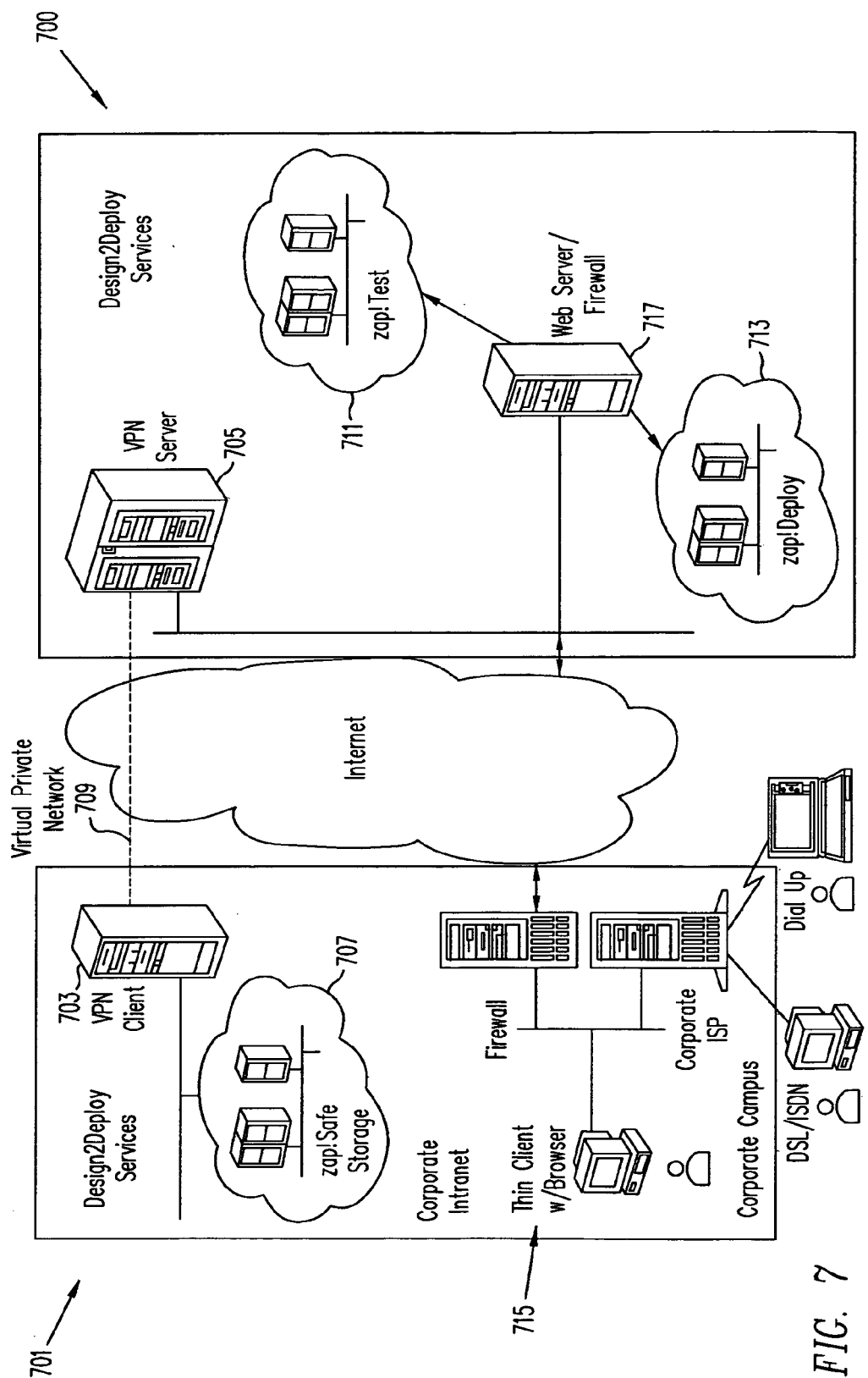

FIG. 3 depicts a memory map of a PC to illustrate details of booting using a disk image. In FIG. 3, a BIOS native to the target machine is instructed (e.g., through DHCP, etc.) to load OpBoot at an area of low memory. Although the invention is discussed with respect to specific boot software, such as OpBoot, any appropriate software or set of instructions can be used.

OpBoot communicates with the server via TFTP to load a disk image. The disk image is loaded to an unused portion of memory such as at 302. In the preferred embodiment, the disk image is an exact image as would be present on a bootable floppy disk. However, other embodiments can use images that vary from such an image.

OpBoot changes vectors used by the native BIOS (e.g., the MSDOS BIOS manufactured by Microsoft, Inc.) as shown in Table VIII.

TABLE VIII

| Vector | Points to |
|---|---|
| 0x11 | Simulated Floppy Controller |
| 0x13 | maps A: to disk image or B: to another disk image |
| 0x15 | Changed to reserved memory for disk image or multiple disk images |

In Table VIII, the BIOS vector 0x11 (also called "interrupt 11h" or "INT 11h") is the hardware list interrupt. It returns what hardware is present in the system. The preferred embodiment intercepts the information returned and changes the information about the floppy drives in the system so that disk images are recognized as "physical" floppy drives.

Next, OpBoot is moved to a different memory location so it will not interfere with the booting according to the disk image. Initially, OpBoot is placed in memory starting at location (hexadecimal) 7C00 by PXE. In a preferred embodiment, OpBoot is moved to below the 640K mark, as shown at 304 of FIG. 3. In other embodiments, other locations can be used. Vector 0x15 is set to prevent other instructions from accessing memory area 302.

OpBoot emulates BIOS operation by loading the first 512 bytes of floppy data (in this case the floppy image data) into memory at 7C00. The first 512-bytes of the floppy then completes the "boot" of the floppy image. At this point, usually an OS, such as MS-DOS takes over. MS-DOS and MS-DOS programs use vector 0x13 to access the floppy drive. Usually 0x13 calls are redirected into the BIOS. In this case, they get redirected to OpBoot.

The floppy drive is typically accessed as "A:" pointed to by vector 0x13. Since vector 0x13 has been modified to point to the disk image stored at 302, the BIOS, instead, obtains data from locations at 302. At this point programs running on top of the floppy OS (such as MS-DOS) can use the vector 0xA1 (INT A1h) to obtain the arguments passed to it from the DHCP option-135.

As can be seen, the procedure described, above, essentially "tricks" the BIOS (or other operating system, kernel, boot-up routine, etc.) to use data from memory instead of attempting to read boot-up data from a floppy (or other device or location). In the preferred embodiment, a dynamic computing environment (DCE) is provided where many computers can be connected together, on demand, and automatically configured with software or made to perform desired tasks.

The ability to download bootable disk images to many target machines at boot-up (after power-up), allows a manager of the DCE to use customers' existing boot-up diskettes to create disk images that can be distributed instantly, as desired. This is a huge benefit to the DCE manager and to customers, alike. The customers do not have to redefine, reformat or reprogram boot-up parameters and the DCE manager does not have to attempt to understand, analyze or explain how boot-up disk images must be changed or converted. Moreover, since the physical medium (i.e., the diskette) has been eliminated, the boot-up information can be easily stored, tracked and transferred.

Table IX, below, shows basic steps in the OpBoot operation.

TABLE IX

Pseudo code for opboot:

1. Parse DHCP option 135 for arguments and floppy image name(s).
2. Download each floppy image into extended memory (see INT 15h).
3. Relocate OpBoot from 7C00 to just below the 640K mark.
4. Point the interrupt vectors 0x11, 0x13, 0x15, 0xA1 into OpBoot's code.
5. Load first sector of floppy into memory 7C00 and jump to it to complete boot process.
6. If a program (such as an MS-DOS program) calls vector 0x13, check if the program requested a floppy drive. If so, read and write the data from the downloaded image in extended memory instead of the physical floppy (if present).

TABLE IX-continued

Pseudo code for opboot:

7. If a program (such as an MS-DOS program) calls vector 0x11, fixup the floppy drive count to include the "fake" floppies in memory.
8. If a program (such as an MS-DOS program) calls vector 0x15, report the extended memory not including the memory reserved for the floppy images.
9. If a program (such as an MS-DOS program) calls vector 0xA1, return the requested information. If the request was for the parameters passed in DHCP option-135, use a saved copy of the parameters.

Processor Redirection to Remote Resources

Next, details of step 9 of Table VI are discussed. It should be apparent that these details can be performed in association with other steps and need not have all operations executed in association with step 9 of Table VI.

A preferred embodiment of the invention uses the OpBoot UDP/IP stack to communicate with the managing computer. The OpBoot UDP/IP stack is a communication protocol definition in software that is resident, for example, on an external network card or a card built into the motherboard that contains a PXE boot ROM. Such cards as network cards, input/output cards, graphics accelerators, serial communication ports, etc., are physically separate from a motherboard. Typically a motherboard houses the processor, memory and supporting circuitry. Usually a motherboard and its components are designed and manufactured (or assembled) under the control of a single business entity. In this respect, the processor's use of any on-motherboard resources is programmed in at the time of manufacture. Since all of the components are coordinated by a single manufacturer, the processor typically has the ability to access, or use, any resource on the motherboard.

In contrast, external cards mate to the motherboard and are physically separate from the motherboard and interface via an on-motherboard bus such as an IDE, PCI, AGP or other bus. The external cards are designed by third-party manufacturers and are usually not in a close design relationship with the motherboard, and motherboard component, designers.

Note that, although the present invention is discussed primarily with respect to a UDP/IP protocol stack resident in an Intel PXE BIOS on an Intel UNDI external card, other resources and cards can be used. Any type of protocol, utility or other resource such as memory, processor, communication ports or other hardware or software (collectively "resources") on any type of card, can be suitable for use with the present invention. In general, the invention includes permitting a processor on a motherboard to access resources from an off-motherboard location by redirecting the processor to the resource location.

A preferred embodiment of the invention redirects vectors in a PC-compatible BIOS. The vector location 0xA1 ("Jareva OpBoot API Interrupt") is modified at step 7 to point into OpBoot which then calls PXE boot ROM functions for the appropriate request in the off-motherboard network card. This allows the processor in the target machine to use the PXE commands listed in Table VII, above.

Functions in Table VII hook through the same vector and invoke OpBoot code to handle the request. The OpBoot code calls the PXE routines on the network card to allow the target machine to open a network communication, send information to the managing computer, receive information from the managing computer, and close the network communication. With these basic commands, the managing computer is able to interrogate and direct the target machine as, for example, in a managed boot-up scenario. Note that other mechanisms can be used to allow a target machine to use off-motherboard resources.

The managing computer has great flexibility to interrogate, direct, and perform other functions on, or with, the target machine. Using the network communication provided by the remote card UDP/IP stack the managing computer can send back instructions in a control language, as is known in the art. In this manner, the use of off-motherboard resources is an efficient mechanism to allow a target machine to communicate with a managing computer (or other device) without requiring a communication protocol to be loaded onto the motherboard (or other) resources. Thus, time and memory space and complexity can potentially be reduced.

Note that no special software is needed to build the network stack in the approach of the present invention. This is an advantage over a typical approach of using special networking drivers included in an OpBoot image, or other executable, that would be used to acquire additional software to build the network stack. Note that with the latter approach, the drivers and software are designed to work with specific network card and stack software. One advantage of the invention is that multiple network cards having PXE can be handled in the same manner, without requiring dedicated software.

Table X shows basic steps in a procedure for using the PXE resources of a network card.

TABLE X

1. OpBoot installs itself at vector $A1 (i.e. OpBoot "hooks" INT A1h). OpBoot also does not de-install the PXE handlers, as a normal NBP (network boot program—see PXE documentation) would. It leaves them around for later use.
2. The boot continues as normal. (See "disk image boot" pseudo code for OpBoot)
3. The user's program executes. If the user calls the OpBoot API (i.e executes the x86 instruction "INT A1h" with the proper arguments), the OpBoot code connected to vector $A1 will gain control. It then does the following.
4. For Open/Close/Read/Write Network, once it gains control, the OpBoot code will take the arguments passed by the user from the CPU registers and re-wrap them into arguments for the PXE boot ROM. It then directly calls the PXE boot ROM with those arguments.
5. For the other calls (like "get IP address") it uses information saved from the original PXE DHCP response packet. It simply returns that info to the user.

Although the system of the present invention has been described with respect to specific embodiments thereof, these embodiments are illustrative, and not restrictive, of the invention. For example, although the invention has been discussed primarily with respect to PC-compatible computers, any type of computer can be used with the present invention.

Thus, the scope of the invention is to be determined solely by the appended claims.

What is claimed is:

1. A method for allowing a processor on a motherboard to communicate with a network without loading a network communication protocol, the method comprising:

directing the processor to use an off-motherboard communication protocol, wherein a network interface card is configured to communicate with the network using the off-motherboard communication protocol;
generating arguments for the network interface card usin an internal communication protocol, wherein said generating is performed by the processor; and
providing the arguments to the network interface card.

2. The method of claim 1 wherein said directing further comprises:
modifying a vector in the processor so that an access to the off-motherboard communication protocol is effected.

3. The method of claim 1, wherein the off-motherboard communication protocol includes a UDP/IP stack.

4. The method of claim 1 further comprising:
providing said generating using a programming interface.

5. The method of claim 4 wherein said generating arguments comprises:
providing user arguments from a user program to the programming interface, and
encapsulating the user arguments into arguments for the network interface card using the internal communication protocol.

6. The method of claim 1 wherein the internal communication protocol comprises:
a pre-boot extension environment (PXE) protocol.

7. An apparatus for allowing a managing computer to control the boot-up of a target machine, the apparatus comprising
a network card, wherein
the network card comprises an off-motherboard communication protocol; and
a processor on a motherboard of the target machine and coupled to the network card, wherein
the processor is configured to use the off-motherboard communication protocol to communicate with the managing computer to effect a controlled boot-up,
generate arguments for the network interface card usin an internal communication protocol, and
provide the arguments to the network interface card.

8. The apparatus of claim 7, wherein the processor is disposed to execute instructions for redirecting the processor through a vector location 0xA1.

9. A computer-readable medium for allowing a managing computer to control the boot-up of a target machine, the computer readable medium comprising:
a first set of instructions, executable by a processor in the target machine, configured to use an off-motherboard communication protocol to communicate with the managing computer to effect a controlled boot-up;
a second set of instructions, executable on the processor in the target machine, configured to use generate arguments for the network interface card using an internal communication protocol; and
a third set of instructions, executable on the processor in the target machine, configured to provide the arguments to a network interface card, wherein
the network interface card comprises the off-motherboard communication protocol.

10. An apparatus comprising:
a network interface card, wherein the network interface card comprises an off-motherboard communication protocol;
a processor on a motherboard of a target machine and coupled to the network interface card;
means for directing the processor to use the off-motherboard communication protocol;
means for generating arguments for the network interface card using an internal communication protocol; and
means for providing the arguments to the network interface card.

* * * * *